United States Patent
Pancras et al.

(10) Patent No.: US 9,814,919 B2
(45) Date of Patent: Nov. 14, 2017

(54) DEGRADING HALOGENATED ORGANIC COMPOUNDS

(75) Inventors: Tessa Alida Pancras, Arnhem (NL); Wim Plaisier, Arnhem (NL); Pieter Jacobus Anna Dols, Arnhem (NL); Jan Adriaan Barbier, Arnhem (NL)

(73) Assignee: Arcadis Nederland B.V., Arnhem (NL)

( * ) Notice: Subject to any disclaimer, the term of this patent is extended or adjusted under 35 U.S.C. 154(b) by 271 days.

(21) Appl. No.: 13/369,179

(22) Filed: Feb. 8, 2012

(65) Prior Publication Data
US 2013/0200303 A1 Aug. 8, 2013

(30) Foreign Application Priority Data
Feb. 8, 2012 (NL) ...................................... 2008263

(51) Int. Cl.
| | | |
|---|---|---|
| B09C 1/08 | (2006.01) | |
| B01D 1/00 | (2006.01) | |
| E02B 13/00 | (2006.01) | |
| A62D 3/38 | (2007.01) | |
| A62D 3/37 | (2007.01) | |
| C02F 1/72 | (2006.01) | |
| A62D 101/22 | (2007.01) | |
| C02F 101/36 | (2006.01) | |
| C02F 103/00 | (2006.01) | |
| C02F 103/06 | (2006.01) | |

(52) U.S. Cl.
CPC ................ *A62D 3/38* (2013.01); *A62D 3/37* (2013.01); *B09C 1/08* (2013.01); *C02F 1/722* (2013.01); *A62D 2101/22* (2013.01); *C02F 2101/36* (2013.01); *C02F 2103/001* (2013.01); *C02F 2103/06* (2013.01)

(58) Field of Classification Search
CPC ..... C02F 1/68; C02F 1/70; C02F 1/72; C09K 3/00; A62D 3/34
USPC ........ 424/273, 285, 300, 309; 548/341, 378; 252/186.21, 188.2
See application file for complete search history.

(56) References Cited

FOREIGN PATENT DOCUMENTS

| | | | |
|---|---|---|---|
| CN | 101708883 A | * | 5/2010 |
| KR | 20090067664 A | | 6/2009 |
| KR | 20100009370 A | | 1/2010 |
| WO | 99-56894 A1 | | 11/1999 |

OTHER PUBLICATIONS

ESPACENET translation of CN10170883 pp. 1-7, 2010.*
Liu, C. S., et al., "Oxidative Decomposition of Perfluorooctanesulfonate in Water by Permanganate", Separation and Purification Technology, Nov. 2011.
Moermond, C. T., et al., "Environmental Risk Limits for PFOS", RIVM Report 601714013, 2010.

(Continued)

*Primary Examiner* — Gregory R Delcotto
*Assistant Examiner* — Preeti Kumar
(74) *Attorney, Agent, or Firm* — Peacock Myers, P.C.; Jeffrey Myers; Janeen Vilven

(57) ABSTRACT

A method of degrading halogenated organic compounds, use of the method for decontaminating PFOS (perfluorooctanesulfonic acid) and PFOA (perfluorooctanoic acid) contaminated medium, and a composition such as that which is suitable to be applied in said method.

13 Claims, 1 Drawing Sheet

(56) References Cited

OTHER PUBLICATIONS

Obourn, J., et al., "Mechanisms for the Pancreatic Oncogenic Effects of the Peroxisom Proliferator Wyeth 14,643", Toxicology and Applied Pharmacology 145, 1997, 425-436.
Sargent, John W., et al., "Properties of Perfluorinated Liquids", Federation Proceedings, vol. 29/No. 5, Sep.-Oct. 1970, pp. 1699-1703.
Sohlenius, Anna K., et al., "Effects of Perfluorooctanoic Acid—A Potential Peroxisom Proliferator in Rat—on Morris Hepatoma 7800C1 Cells", Biochimica et Biophysica Acta, 1213, 1994, pp. 63-74.
Watts, Richard J. et al., "Oxidative and Reductive Pathways in Manganese-Catalyzed Fenton's Reactions", Journal of Environmental Engineering, vol. 131/1, Jan. 2005, pp. 158-164.

\* cited by examiner

DEGRADING HALOGENATED ORGANIC COMPOUNDS

CROSS-REFERENCE TO RELATED APPLICATIONS

This application is a continuation application of Netherlands Patent Application Serial No. 2008263, entitled "Degrading Halogenated Organic Compounds", to Arcadis Nederland B.V., filed on Feb. 8, 2012, and the specification and claims thereof are incorporated herein by reference.

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

COPYRIGHTED MATERIAL

Not Applicable.

BACKGROUND OF THE INVENTION

Field of the Invention (Technical Field)

The invention relates to a method of degrading halogenated organic compounds, to a use of said method for decontaminating PFOS (perfluorooctanesulfonic acid) and PFOA (perfluorooctanoic acid) contaminated medium and to a composition such as that which is suitable to be applied in said method.

Description of Related Art

Halogenated organic compounds are equivalents of organic compounds (i.e. compounds comprising at least carbon and hydrogen) wherein some, most, or all, of carbon-linked hydrogen atoms that would have been present in an equivalent organic compound are instead halogen atoms. The halogen atom(s) may be chlorine, fluorine, bromine, iodine, or a combination thereof. Perhalogenated organic compounds are a special class of halogenated organic compounds wherein all of the carbon-linked hydrogen atoms that would have been present in an equivalent organic compound are halogen atoms. As an example, perfluorinated organic compounds (PFCs) are perhalogenated organic compounds with fluorine in place of hydrogen. It is noted that one or more further functional groups attached to a carbon may be present as well.

A class of PFCs that has been widely used in the production of commercial or industrial products, and released into the environment, are perfluorinated fatty acids (PFFAs). PFFAs are synthetic, fully fluorinated analogues of fatty acids characterized by a perfluoro-alkyl chain and a terminal sulfonate or carboxylate head group; chain lengths are typically in the range of 4-28 carbon atoms. Well-known examples of PFFAs are PFOS (perfluorooctanesulfonic acid) and PFOA (perfluorooctanoic acid): both are surfactants; amongst other applications, they have been used in fire-fighting foams, non-stick polymers, coatings for paper and textiles, oxidative protective coatings on metals, as inert surfactants for semi-conductor etching and as thermally stable lubricants. Further examples are perfluoroheptane sulfonic acid (PFHpS (C7S)), perfluorohexane sulfonic acid (PFHxS (C6S)), perfluoropentane sulfonic acid (PFPeS (C5S)), perfluorobutane sulfonic acid (PFBS (C4S)), perfluoroheptanoic acid (PFHpA (C7A)), perfluorohexanoic acid (PFHxA (C6A)), perfluoropentanoic acid (PFPeA (C5A)) and perfluorobutanoic acid (PFBA (C4A)). Cn (where n is an integer) relate to the length of the carbon chain; S identifies the compound as a sulfonic acid, A identifies the compound as a carboxylic acid.

Perfluorinated organic compounds such as PFFAs are very stable with respect to photolysis, thermolysis, chemical degradation (e.g. oxidative degradation), microbial degradation, and metabolism by animals. Whilst this is advantageous for many applications, it poses serious problems with respect to their disposal. Many PFCs, such as PFFAs are environmentally persistent. Due to their stability with respect to degradation and metabolism, it was long thought that PFFAs were non-toxic (Sargent and Seffl 1994). More recent evidence has revealed that this is not the case and shown that at least certain PFFAs are biologically active and can cause peroxisomal proliferation, increased activity of lipid and xenobiotic metabolising enzymes, and alterations in other biochemical processes in exposed organisms (Obourn et al 1997; Sohlenius et al. 1994). Bioaccumulation and biomagnification of PFFAs is problematic. PFOS and PFOA have recently been designated as persistent organic pollutants and have been added to Annex B of the Stockholm convention (Moermond et al., 2010). PFOS is an environmentally persistent degradation product of many perfluorinated organic compounds. Therefore there is a need for a reliable and effective method to degrade said compounds. For PFOS degradation using oxidation or reduction techniques, it is very likely that intermediate compounds will occur. Most likely smaller fluorinated sulfonates and acids will be created.

Many methods for degrading certain classes of halogenated organic compounds are known in the prior art. The majority of these are not suitable for degrading fluorinated and in particular perfluorinated organic compounds such as PFFAs, nor are they suitable for use in environmental "cleanup" applications, i.e., for removing the halogenated organic compounds from the environment, such as in soil remediation, e.g., because no or almost no degradation is obtained. Even if some degradation is obtained e.g. large quantities of degrading chemicals are required or elevated temperatures must be applied.

Fenton's reaction is one example of a reaction that previously has been applied for degrading halogenated organic compounds. The reaction has been applied, for example, for degrading chlorinated environmental contaminants e.g. trichloroethylene (TCE), tetrachloroethylene (PCE), perchloroethylene, perchlorinated biphenyls, etc.

An alternative reaction that has been used to degrade halogenated organic compounds is to use a persulfate in the presence of a metal catalyst. However typically relatively large quantities of catalyst and persulfate have been used and typically at elevated temperature.

In 2008 ARCADIS UK supported research at Imperial College London into oxidative and reductive treatment methods, including those mentioned above, for degrading PFOS in soil and/or ground water. Whilst certain oxidative methods achieved up to almost 100% degradation of the PFOS, these methods involved introducing high concentrations of oxidants and elevated temperatures. The conditions applied in these tests that resulted in effective degradation cannot reasonably, safely or cost effectively be applied in practice to reduce or preferably eliminate PFOS in the environment such as in contaminated soil and/or ground water.

Further tests were executed at ARCADIS NL to determine whether PFOS could be degraded using the set-ups of the experiments performed at ARCADIS UK at more practical, i.e. lower concentrations. The tested methods were methods that are known to be effective for degrading other halogenated organic compounds such as perchlorinated organic compounds and included using temperature activated persulfate, Fenton's reaction, a reaction using hydrogen peroxide and ferrous iron activated persulfate (i.e. using chelated iron) and catalysed persulfate oxidation. Effective degradation was only achieved at e.g. concentrations which are too high (such as from 20% w/w to 80% w/w active compound or combination of active compounds) for practical application in the field. Tests were particularly disappointing in terms of e.g. effectiveness wherein soil and water containing PFOS were combined.

To the inventors knowledge, of the methods of the prior art, only permanganate is known to be somewhat effective for degrading perfluorinated organic compounds such as PFOS (Liu et al. 2011). Disadvantages of using permanganate for degrading halogenated organic compounds, in particular for environmental "cleanup" applications such as in soil remediation, are that elevated temperatures are required and that insoluble manganese dioxide precipitates are formed. Precipitation of manganese dioxide may cause clogging of the soil, resulting in reduced permeability of the soil to water. As a further result, this can prevent proper decontamination of the site by inhibiting oxidant access. Example conditions of the prior art for degrading PFOS with permanganate in buffered aqueous solution are a temperature of 65° C. and a pH of 4.2; under these conditions, identified as being particularly effective by Liu et al., 46.8% degradation was achieved after maintaining these conditions for 18 days, which is somewhat disappointing.

BRIEF SUMMARY OF THE INVENTION

The present invention therefore relates to a method of degrading halogenated organic compounds, including fluorinated and perfluorinated organic compounds, such as PFFAs; to use of the method for decontaminating PFOS and PFOA contaminated medium; and to a composition that is suitable to be applied in said method, wherein one or more of the above disadvantages are overcome.

The invention relates to a method of degrading halogenated organic compounds, preferably in a medium containing said compound(s); to use of the method for decontaminating PFOS (perfluorooctanesulfonic acid) and PFOA (perfluorooctanoic acid) contaminated medium; and to an aqueous composition for oxidizing and/or reducing nonvolatile halogenated organic compounds in a volume of medium.

In an aspect of the invention, degradation comprises a step of oxidizing and/or reducing the halogenated organic compounds.

By degrading the harmful halogenated compounds the amount or concentration is significantly reduced, such as through forming less harmful degradation products, salts, water, carbon dioxide, etc. One of the main advantages of the present invention is the degradation of the compounds to smaller, more harmless products, thereby eliminating environmental 'stress'. Prior art technologies were not successful in removing the PFCs from a subsurface and e.g. found a solution by transporting the compounds to a landfill.

Degradation is defined as reducing the amount of at least a first halogenated organic compound substantially pure, or in a volume of medium, relative to an initial amount of said first halogenated organic compound through chemical modification, fragmentation and/or cleavage, such as through oxidation and/or reduction.

Effective degradation is defined as a reduction in the amount or concentration of at least the first halogenated organic compound substantially pure, or in a medium, relative to an initial amount of said first halogenated organic compound, of at least 40%, preferably greater than 50%, more preferably greater than 60%, most preferably greater than 70%, especially greater than 80%, such as greater than 90%. The amounts of reactants introduced are large enough to be effective, e.g., within given boundary conditions.

Typically it is difficult to degrade halogenated organic compounds, particularly fluorinated organic compounds and most particularly perfluorinated compounds; these are (chemically) very stable. The compounds are typically very persistent, both in time and under typical ambient conditions. Therefore the person skilled in the art is inclined to use higher concentrations of active compounds and/or use higher reaction temperatures compared to those used in the prior art in order to obtain satisfactory degradation. Furthermore, many halogenated organic compounds are toxic for animals and likely also for plants.

The inventors have found experimentally that a combination of two oxidizing reactants is beneficial for degrading the halogenated organic compounds. The oxidizing reactants used separately do not degrade the compounds, or at least not sufficient, in particular under ambient conditions, or in a manner that is suitable for environmental "cleanup". If applicable at all, high concentrations of the separate reactants and/or elevated temperatures would therefore be needed. Such puts a burden on the environment and is not cost effective. The term cost effective indicates that the costs of the present method are much lower than those of prior art methods.

The term ambient conditions relates to a temperature in the range of 1-45° C., such as 2-30° C., e.g. 5-20° C., such as 10-15° C. Depending on the geographical location ambient conditions may vary, as well as, e.g., soil temperature.

The present halogenated organic compounds comprise one or more halogens, which may be the same or different. Typically a significant part of optional hydrogen atoms is replaced by halogens, such as 30% or more. Typically highly halogenated organic compounds are more difficult to degrade than low halogenated compounds. PCB (polychlorinated biphenyl) is a well-known example being very persistent. Only after elaborate scientific and experimental work it has been found that only the present combination of two oxidizing agents is capable of effectively degrading even perhalogenated compounds such as perfluorinated compounds, such as for example PFOS and PFOA. As a consequence the two oxidizing compounds are introduced into the medium within a time frame having at least partial overlapping of activity of the two compounds, preferably a substantial or full overlap.

The organic halogenated compounds can be degraded as such, in a more or less pure form, and when present in a medium. Typically a volume of said medium is treated according to the present method.

The compounds are degraded by oxidizing and/or reducing the organic halogenated compound. It is believed that the combined action of the reactants is required to be capable of reducing the halogenated organic compounds, as e.g. detailed in the example.

It has been found that preferably the method is carried out at more or less neutral or slightly acidic pH, such as lower than pH 10.

As such, the present invention solves one or more of the above mentioned problems, providing further advantages as described throughout the description.

DETAILED DESCRIPTION OF THE INVENTION

In a first aspect, the invention relates to a method for degrading one or more halogenated organic compounds preferably in a medium containing said compound(s), wherein the method comprises:

(a) introducing an amount of a peroxysulfur containing reactant and an amount of a permanganate containing reactant, the combined amount being effective to degrade the halogenated organic compound(s); and (b) oxidising and/or reducing the halogenated organic compound(s), preferably at an initial pH<10.

In an exemplary embodiment, the permanganate containing reactant is a permanagante salt such as sodium permanganate or potassium permanganate; the peroxysulfur containing reactant is any compound with an —S—O—O—S⁻ bridge, such as $S_2O_8^{2-}$ i.e. peroxydisulphate, or an —S—O—O⁻ containing salt, such as a sodium or potassium salt of $SO_5^-$ i.e. a peroxymonosulfate, or $RSO_4^-$ e.g. an arylsulfonylperoxy anion.

In an exemplary embodiment, oxidizing and/or reducing the halogenated organic compound(s) is performed under ambient conditions.

In an exemplary embodiment, the permanganate containing reactant is introduced in an amount sufficient to activate degradation of the halogenated organic compound in the presence of the amount of the peroxysulfur containing reactant and/or wherein it is through combining the permanganate containing reactant and the peroxysulfur containing reactant in the presence of the halogenated organic compound(s) that the halogenated compound(s) is/are effectively degraded.

As mentioned above a combined action of permanganate and peroxysulfur containing reactants is required. In an example the permanganate activates degradation, i.e., functions as a sort of initiator thereto. Such implies that both permanganate and peroxysulfur reactants are introduced, in order to be effective, preferably substantially at the same time, at least within 4 days or less. The active compounds can be introduced at once, or stepwise, such as drop-by-drop, as well as sequential, and combinations thereof. Therewith, at a certain point in time, an effective amount of the active compounds is present.

It is also possible to combine the two above reactants, which combination makes it then possible to effectively degrade the halogenated organic compound.

One of the advantages is that with relatively low concentrations, especially in view of quantities used in the prior art, an effective degradation is provided. Even further, the use of permanganate quantities can be limited substantially. Thus applied concentrations are significantly lower.

In an exemplary embodiment, the halogenated compound(s) is/are non-volatile, and/or oxidising and/or reducing the halogenated organic compound(s) comprises reacting one or more chemical species formed by combining the peroxysulfur containing reactant and the permanganate containing reactant with the halogenated organic compound(s) in the volume of medium.

For information, 1-hexanol may be used as a hydroxyl radical probe and to identify oxidant production. To investigate reductant production, carbon tetrachloride may be used as a probe. 1-hexanol is readily oxidised, but is not readily reduced, whereas in contrast carbon tetrachloride is readily reduced, but not readily oxidised (Watts et al. 2005).

The present invention relates preferably to non-volatile organic compounds, i.e., compounds that are at ambient conditions largely in liquid or solid state, and remain therein, e.g., having a vapor pressure at 25 C of less than 10 kPa, in particular less than 2 kPa, mostly lower than 0.1 kPa, and often lower than 10 Pa. Therewith non-volatile compounds behave physically and chemically very different compared to volatile compounds.

In the example the organic compounds may be both oxidized and reduced, thereby improving efficiency, e.g., in terms of relative amounts being degraded, such as is evidenced by the accompanying examples.

The peroxysulfur containing reactant and the permanganate containing reactant may form one or more further species, which one or more further species support degradation of the organic compound.

In an exemplary embodiment, the halogenated organic compounds are perhalogenated organic compounds, preferably perfluorinated organic compounds. Such compounds are in general extremely difficult to degrade. Typically no method and/or degrading compounds are known, at least not being effective. It is only by experimental research the present inventors have been able to find a suited method and suited (combination of) reactants. The perfluorinated compounds are found to be even more persistent. Such is also a reason these compounds are used in, e.g., fire fighting foam or aqueous film forming foam.

In an exemplary embodiment, the medium is a medium selected from a group comprising: soil, aqueous liquid, foam, sludge, sediment, run-off water, ground water, industrial effluent, surface water, waste product, non-aqueous (phase) liquid, process water, or a combination thereof.

It is noted that the present method may relate to natural mixtures of the above and to man-made mixtures, e.g. by treating soil in an apparatus.

The term soil relates to a top layer of the earth and similar compositions. It typically comprises a gas phase, such as air, a liquid phase, such as water, e.g., groundwater, and a solid phase, such as rock, clay, sand, etc. Typically minerals, organic matter, etc., are also present. Therefore from a chemical point of view the soil is a very complex system, typically being very difficult to model.

The foam may relate to a fire extinguisher. The aqueous liquid may relate to a liquid comprising water, such as ground water, waste water, extinguish water, etc.

In an exemplary embodiment, the method is performed in a volume or soil and/or aqueous liquid with an initial pH in the range of 5 to 9, preferably 6.5 to 8. It has been found that the present method is not particularly effective at basic pH, e.g. above pH=10. Preferably the pH is not too acidic, e.g., larger than pH=2. Within a pH of 5-9 the present method is most effective, e.g. in terms of percentage of organic compound degraded, amounts of chemicals used, etc. It is noted that the pH may change during the present method, therefore the pH referred to be an initial pH, i.e., before carrying out the present method. Typically the pH will not change very much when carrying out the invention, e.g., less than 1-2 units. If so, the pH may be corrected, e.g. by applying a buffer.

In an exemplary embodiment, the peroxysulfur containing reactant is a peroxymonosulfate or a peroxydisulfate containing compound. It has been found that these two reactants perform very well, e.g., in terms of percentage of halogenated organic compound being degraded, amounts needed, etc.

In an exemplary embodiment, the amounts of the peroxysulfate and permanganate containing reactants are in a molar ratio in a range of 5:1 to 500:1. The present invention therewith provides a relative broad range of molar ratios, such as 10:1, 25:1, 50:1, and even 100:1, or 250:1. In other words relative small quantities of permanganate reactants have been found to be effective.

In an exemplary embodiment, the method further comprises a step of determining oxidant demand of the medium such as of soil and/or groundwater. Sometimes it is useful first to provide for the oxidant demand of the medium such as of the soil. Thereto typically the person skilled in the art will determine said oxidant demand, and subsequently calculate an amount of oxidant needed in order to fulfill said oxidant demand. As such a relatively cheap and possibly more effective chemical compound (or combination thereof) may be used, optionally being a further compound.

In an exemplary embodiment, the peroxysulfate and permanganate containing reactants are used at concentrations in the ranges of 10-1000 mmol/l and 1-10 mmol/l respectively. As mentioned above relative low amounts may be used, e.g. 20-500 mmol/l peroxysulfate, such as 50-250 mmol/l, e.g., 100-200 mmol/l, and e.g. 2-8 mmol/l permanganate, such as 3-6 mmol/l, e.g. 4-5 mmol/l. Typically such amounts will be determined with a routine test, after carrying out the invention, in view of, e.g., percentage degraded organic compound, and adjusted accordingly. The ranges identified in this exemplary embodiment relate to concentrations in a liquid medium, i.e., mmol/l refers to mmol of reactant to liter of medium; wherein the medium is at least partially non-liquid, e.g., a mixture of water and soil, the ranges are adapted accordingly such as the units being modified to mmol/kg i.e. mmol of reactant (peroxysulfate or permanganate containing reactant) per kilogram of medium.

In an exemplary embodiment, the medium is soil and/or the water contained therein; the method is performed ex-situ for soil remediation; and the method further comprises a step of water extraction and/or a step of mixing, such as soil mixing. Such indicates that soil may be removed from a location towards, e.g., an apparatus suited for the present method. After degrading, the soil may be returned. Such a method may include extraction of water, e.g., to treat water separately. Such can, e.g., be very effective as chemical and physical conditions of water and soil differ a lot, and the present method as such can be optimized in view of these separate conditions. It may be advantageous to mix the soil, such as with other parts thereof, with water, with groundwater, etc., e.g., in order to improve accessibility and efficiency.

The present invention covers therefore any in-situ application, such as by introducing the two compounds into a soil/water/soil gas matrix (either via injection, infiltration, physical mixing or some other way). It also covers therefore ex-situ applications, such as by extracting groundwater with PFCs in soil from a subsurface thereof and treating it in an above ground system, or taking the soil and treating the soil. Examples hereof are in-situ remediation (mixture of soil and groundwater and sludge); ex-situ remediation of groundwater by extraction of groundwater from soil and/or remediation of percolate water, e.g., from landfill sites; ex-situ remediation of sludge and/or soil by mixing it with water and apply the invention in a basin and/or reservoir; and ex-situ remediation of soil (mixture of soil and groundwater) by prior excavation and treatment in an installation (apparatus).

It is believed that terms as in-situ, ex-situ, soil mixing, etc., are known to the person skilled in the art.

In an exemplary embodiment, the medium is soil and/or the water contained therein; the method is performed in-situ for soil remediation and the method further comprises a step of soil infiltration wherein the permanganate and peroxysulfate containing reactants are introduced into the soil and/or the water contained therein. It may also be envisaged to treat soil or the like in-situ, e.g., at a location where it is contaminated. Typically such requires complex steps of infiltration, e.g., at various locations placed apart and at various depths. Even amounts introduced may be varied accordingly. The present method is therefore specifically effective when treating contaminated soil, such as at airfields.

In a second aspect, the invention relates to use of the method of the invention to decontaminate a medium contaminated with perfluorooctanesulfonic acid (PFOS) and/or perfluorooctanoic acid (PFOA) such as a medium comprising soil and/or groundwater. The present method is especially suitable for fluorine comprising organic compounds, such as PFOS and PFOA, preferably having a chain length of 4-28 carbon atoms, such as of 4-10 carbon atoms. Other examples of such compounds include PFHpS (C7S), PFHxS (C6S), PFBS (C4S), PFHpA (C7A), PFHxA (C6A), PFPeA (C5A) and PFBA (C4A). Outside these ranges, e.g., the efficiency drops somewhat. Prior art methods are not capable, or at least not effectively, of degrading such very persistent compounds. The present method is therefore also particularly suited for comparable compounds as well such as other perfluorinated fatty acids.

It is noted that by degradation smaller compounds are being formed. These smaller compounds potentially also comprise one or more halogens, and may be harmful to the environment/toxic as well. Therefore it is important that these smaller compounds are also degraded. In terms of degradation of total amount of halogenated compounds the present invention is very effective in that both the larger compounds as PFOS as well as smaller compounds are degraded. An advantage of the invention is that the present method is uniquely tuned to, e.g., PFOS chemistry by quantitatively generating F anions, which cannot be achieved by any prior art or by any obvious adaptation of prior art.

In a third aspect, the invention relates to aqueous composition for oxidizing and/or reducing non-volatile halogenated organic compounds in a medium wherein the composition comprises a persulfate containing reactant and a permanganate containing reactant, wherein the amounts of the peroxysulfate and permanganate containing reactants are in a molar ratio in the range of 5:1 to 500:1, preferably in the range of 100:1 to 500:1, such as with the peroxysulfate and permanganate containing reactants being used at concentrations in ranges of 10-1000 mmol/l and 1-10 mmol/l respectively. Though comparable compositions may be known, the present composition seems unknown in the prior art, specifically for the present use. Further details of the present composition are given throughout the description.

The present invention also relates to combinations of the above exemplary embodiments.

The invention although described in detailed explanatory context may be best understood in conjunction with the accompanying figures and/or examples.

EXAMPLES

Samples comprising 250 g soil, 250 ml of water, 260 mg/l sodiumpermanganate, an amount of sodium peroxydisulfate and a mixture of PFOS and PFOA in known amounts (e.g., 20 ng/l-500 mg/l PFOS or PFOA), were prepared and allowed to react. After a defined period (2 weeks), the extent of degradation of PFOS and PFOA was measured. The samples had an initial concentration PFOS of 30000 ng/l and 5000 ng/l PFOA. It is noted that these concentrations are regarded as problematic levels at the site, and remedial targets will most likely need to be in the low ng/l range. Amounts of sodium peroxydisulfate used (% wt./vol) and (averaged) percentages of PFOS and PFOA remaining in the samples are given in Table 1 below. Each sample was measured in duplicate.

TABLE 1

| Number test: | 1 | 2 | 3 | 4 |
|---|---|---|---|---|
| PFC: | 0.5% $Na_2S_2O_8$, Mn | 1% $Na_2S_2O_8$, Mn | 2.5% $Na_2S_2O_8$, Mn | 5% $Na_2S_2O_8$, Mn |
| Perfluoroctanesulfonic acid (PFOS) | 24.6 | 16.2 | 17.3 | 5.4 |
| Perfluoroctanoic acid (PFOA) | 49.4 | 41.0 | 37.9 | 20.5 |

As is evident form the table, effective degradation of both PFOS and PFOA was achieved through applying the method of the invention.

Therein produced degradation products and chemicals used proved to be less harmful to the environment. In control experiments wherein one or other of the amount of peroxydisulfate or the amount of permanganate reactants were left out, satisfactory/effective degradation of PFOS or PFOA was not achieved. The total amount of active compound i.e. the combination of permanganate and persulfate, is preferably in the range of 0.1 to 10%, providing satisfactory degradation. It has been found experimentally that the present invention provides satisfactory results in the absence of further compounds, such as chelating ligands. The degradation of PFOS and PFOA was much higher than expected based on experiences in the prior art, e.g., in view of concentrations of active compounds, temperature used, etc. In a further example in absence of soil, starting concentrations were 53000 ng/l PFOS and 5000 ng/l PFOA. Final concentrations were 144 ng/l for PFOS and 128 ng/l for PFOA (i.e. 99.7% reduction for PFOS and 96.5% for PFOA).

The invention is further detailed by the Figures of the Drawings, which are exemplary and explanatory of nature and are not limiting the scope of the invention. To the person skilled in the art it may be clear that many variants, being obvious or not, may be conceivable falling within the scope of protection, defined by the present claims.

Figure 1A:
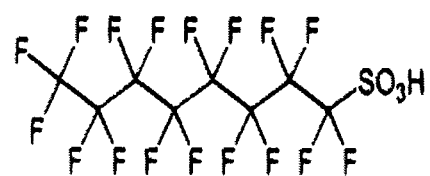
FIGS. 1a and 1b show the structures of PFOS (perfluorooctanesulfonic acid) and PFOA (perfluorooctanoic acid).
Figure 1B:
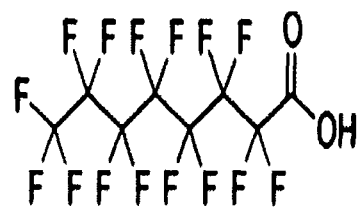

The structures of PFOS and PFOA are provided as non-limiting examples of halogenated organic compounds whose effective degradation may be achieved through the method of the invention. In an exemplary embodiment, the method may be advantageously applied for environmental "cleanup", such as for soil remediation.

What is claimed is:

1. A method for degrading >80% of one or more halogenated non-volatile organic compounds within two weeks in a medium containing said one or more compound, wherein the halogenated non-volatile organic compounds are perfluorinated organic compounds, wherein the method comprises:
   (a) introducing an amount of a peroxysulfur containing reactant and an amount of a permanganate containing reactant, the permanganate activating degradation, the combined amount being effective to degrade the halogenated non-volatile organic compound(s), and;
   (b) oxidizing and/or reducing the halogenated non-volatile organic compound(s), at an initial pH<10, wherein oxidizing and/or reducing the halogenated non-volatile organic compound(s) is performed under ambient conditions at a temperature in the range of 1-45° C.

2. The method according to claim 1, wherein the permanganate containing reactant is introduced in an amount sufficient to activate degradation of the halogenated organic compound in the presence of the amount of the peroxysulfur containing reactant and/or wherein it is through combining the permanganate containing reactant and the peroxysulfur containing reactant in the presence of the halogenated organic compound(s) that the one or more halogenated compound(s) are effectively degraded.

3. The method according to claim 1, wherein oxidizing and/or reducing the halogenated organic compound(s) comprises reacting one or more chemical specie(s) formed by combining the peroxysulfur containing reactant and the permanganate containing reactant with the halogenated organic compound(s) in the medium.

4. The method according to claim 1, wherein the medium is selected from a group comprising: soil, aqueous liquid, foam, sludge, sediment, run-off water, ground water, industrial effluent, process water, waste water, or a combination thereof.

5. The method according to claim 1 wherein the method is performed in a volume or soil and/or aqueous liquid with an initial pH in a range of 5 to 9.

6. The method according to claim 1, wherein the peroxysulfur containing reactant is a peroxymonosulfate or a peroxydisulfate containing reactant.

7. The method according to claim 1, wherein the amounts of the peroxysulfate and permanganate containing reactants are in a molar ratio in a range of 5:1 to 500:1.

8. The method according to claim 1, wherein the method further comprises a step of determining oxidant demand of the medium such as of soil and/or groundwater.

9. The method according to claim 1, wherein the peroxysulfate and permanganate containing reactants are used at concentrations in ranges of 10-1000 mmol/l and 1-10 mmol/l respectively.

10. The method according to claim 1, wherein:
    the medium is soil and/or the water contained therein;
    the method is performed ex-situ for soil remediation; and
    the method further comprises a step of water extraction and/or a step of mixing.

11. The method according to claim 1, wherein:
    the medium is soil and/or the water contained therein;
    the method is performed in-situ for soil remediation; and
    the method further comprises a step of soil infiltration wherein the permanganate and peroxysulfate containing reactants are introduced into the soil and/or the water contained therein, and/or a step of mixing.

12. The method of claim 1 wherein the medium comprises soil and/or groundwater.

13. The method of claim 5 wherein the initial pH is in a range 6.5 to 8.

\* \* \* \* \*